(12) United States Patent
Huang et al.

(10) Patent No.: US 8,780,084 B2
(45) Date of Patent: Jul. 15, 2014

(54) APPARATUS FOR DETECTING A TOUCHING POSITION ON A FLAT PANEL DISPLAY AND A METHOD THEREOF

(75) Inventors: Chen Yi Huang, Taichung (TW); Te Sheng Tseng, Taichung (TW); Chao Yang Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 600 days.

(21) Appl. No.: 12/656,929

(22) Filed: Feb. 19, 2010

(65) Prior Publication Data
US 2011/0043484 A1   Feb. 24, 2011

(30) Foreign Application Priority Data
Aug. 21, 2009   (TW) ................................ 98128169 A

(51) Int. Cl.
*G06F 3/042* (2006.01)
(52) U.S. Cl.
USPC .......................................................... 345/175
(58) Field of Classification Search
None
See application file for complete search history.

(56) References Cited

U.S. PATENT DOCUMENTS

| | | | | |
|---|---|---|---|---|
| 4,811,004 A * | 3/1989 | Person et al. | ................. | 345/175 |
| 5,196,835 A * | 3/1993 | Blue et al. | ...................... | 345/175 |
| 5,317,140 A * | 5/1994 | Dunthorn | ...................... | 250/221 |
| 5,789,739 A * | 8/1998 | Schwarz | ...................... | 250/221 |
| 6,362,468 B1 * | 3/2002 | Murakami et al. | ............ | 250/221 |
| 6,480,187 B1 * | 11/2002 | Sano et al. | ..................... | 345/175 |
| 6,650,450 B1 * | 11/2003 | Orino et al. | ................... | 398/140 |
| 6,674,424 B1 * | 1/2004 | Fujioka | ......................... | 345/157 |
| 6,760,009 B2 * | 7/2004 | Omura et al. | ................. | 345/157 |
| 6,816,537 B2 * | 11/2004 | Liess | .............................. | 372/109 |
| 6,864,882 B2 * | 3/2005 | Newton | ........................ | 345/173 |
| 7,050,048 B2 * | 5/2006 | Ito | ................................. | 345/175 |
| 7,113,174 B1 * | 9/2006 | Takekawa et al. | ............. | 345/173 |
| 7,460,110 B2 * | 12/2008 | Ung et al. | ..................... | 345/173 |
| 2001/0028344 A1 * | 10/2001 | Iwamoto et al. | ............. | 345/175 |
| 2003/0001825 A1 * | 1/2003 | Omura et al. | ................. | 345/173 |
| 2004/0061689 A1 * | 4/2004 | Ito | ................................. | 345/175 |
| 2005/0156100 A1 * | 7/2005 | Xie et al. | ...................... | 250/221 |
| 2006/0227120 A1 * | 10/2006 | Eikman | ........................ | 345/175 |
| 2007/0236454 A1 * | 10/2007 | Ung et al. | ..................... | 345/158 |
| 2008/0093542 A1 * | 4/2008 | Lieberman et al. | ...... | 250/227.14 |
| 2008/0111797 A1 * | 5/2008 | Lee | ................................. | 345/175 |
| 2008/0192015 A1 * | 8/2008 | Lieberman | .................... | 345/173 |
| 2010/0110005 A1 * | 5/2010 | Chtchetinine et al. | ........ | 345/158 |

* cited by examiner

*Primary Examiner* — Amare Mengistu
*Assistant Examiner* — Antonio Xavier
(74) *Attorney, Agent, or Firm* — Bacon & Thomas, PLLC

(57) ABSTRACT

This invention provides an apparatus for detecting a touching position on a flat panel display, including a display panel for displaying text and picture information, an electrically-controlled swing element with the angle of swing thereof being controlled by an electrically-driven actuator, a light source with a light beam thereof being reflected onto a display plane of the display panel or an upper or lower plane proximate to the display plane by the electrically-controlled swing element, an optical system with the optical axis thereof being parallel to the display plane, and a photo-sensing element disposed at an image plane of the optical system. A one-dimensional position of a touching point on the display panel is obtained from the photo-sensing element. Another one-dimensional position of the touching point is obtained from the said one-dimensional position and the angle of swing of the electrically-controlled swing element.

16 Claims, 3 Drawing Sheets

APPARATUS FOR DETECTING A TOUCHING POSITION ON A FLAT PANEL DISPLAY AND A METHOD THEREOF

BACKGROUND OF THE INVENTION

1. Field of the Invention

The present invention relates to an apparatus for detecting a touching position on a flat panel display, and more particularly, to an optical apparatus for detecting a touching position on a flat panel display.

2. Description of the Prior Art

A touch panel is a type of flat panel display which serves as both the input and output interface so that electronic devices incorporating it therein can perform input tasks without an additional input device. Accordingly, it has been widely utilized in the art and has become a very popular user interface (UI).

Currently, a touching position on a touch panel is detected mainly by utilizing resistive, capacitive, ultrasonic, optical principles, etc. A resistive touch panel is constituted by two transparent electrically conductive thin films spaced by a separator. When a finger presses the touch panel, the two electrically conductive thin films come in contact with each other, resulting in a change in the voltage. A sensing apparatus then senses the change in the voltage to determine the X-coordinate and Y-coordinate of the touching point on the touch panel. For capacitive touch panels, the finger is capacitively coupled to the sensing line, thus a sensing apparatus can sense the change in the capacitance to determine the X-coordinate and Y-coordinate of the touching point. For ultrasonic touch panels, the ultrasonic transmitters disposed at the three corners thereof form an even ultrasonic field. When a finger touches the touch panel, a sensing apparatus senses the change in the energy to determine the X-coordinate and Y-coordinate of the touching point.

There are a number of types of optical touch panels, including infrared touch panels, optical imaging touch panels and image recognition touch panels. For infrared touch panels, the infrared transmitters are disposed around the touch panel to form a matrix pattern, thus a sensing apparatus can sense the change in light to determine the X-coordinate and Y-coordinate of the touching point on the touch panel. For optical imaging touch panels, the shadow of a touching object is sensed by the imaging lens assemblies placed at two corners of the touch panel, and then triangulation is performed to determine the position of the touching object. As for an image recognition touch panel, it detects the image rather than the shadow of the touching object. However, the image recognition touch panel has a drawback of requiring multiple imaging lens assemblies.

SUMMARY OF THE INVENTION

The present invention provides an apparatus for detecting a touching position on a flat panel display. The apparatus features uncomplicated components and is capable of determining the position of a touching point on the flat panel display without employing complex image recognition processing technology, so that the response efficiency thereof can be improved.

An apparatus for detecting a touching position on a flat panel display of the present invention can be directly integrated with existing flat panel displays such that the manufacturing cost can be reduced.

The present invention provides an apparatus for detecting a touching position on a flat panel display, including: a display panel for displaying text and picture information; an electrically-controlled swing element, the angle of swing thereof being controlled by an electrically-driven actuator; a light source, a light beam thereof being reflected onto a display plane of the display panel or an upper or lower plane proximate to the display plane by the electrically-controlled swing element; an optical system, the optical axis thereof being parallel to the display plane; and a photo-sensing element disposed at the image plane of the optical system, the photo-sensing element being configured to capture information related to a one-dimensional image of a touching point on the display panel through which a one-dimensional position of the touching point can be determined. Alternatively, an included angle between the optical axis of the optical system and a light beam entering the optical system reflected from the touching point can be determined, depending on the type of optical system and photo-sensing element adopted. Another one-dimensional position of the touching point is obtained from the information related to the one-dimensional image and the angle of swing of the electrically-controlled swing element, or from the measured included angle between the light beam reflected from the touching point and the optical axis of the optical system and the angle of swing of the electrically-controlled swing element. Another aspect of the present invention provides a method for detecting a touching position on a flat display panel, including the steps of: emitting a light beam; reflecting the light beam onto a display plane of the flat display panel or an upper or lower plane proximate to the display plane such that the reflected light beam periodically scans the entire display plane; capturing information related to a one-dimensional image of a touching point on the display plane through which a one-dimensional position of the touching point can be determined or an included angle between the light beam reflected from the touching point and entering the optical system and the optical axis of the optical system; and obtaining another one-dimensional position of the touching point based on the information concerning the one-dimensional image and an included angle between the light beam and its reflected light beam, or based on the included angle between the light beam reflected from the touching point and entering the optical system and the optical axis of the optical system and the included angle between the light beam and its reflected light beam.

DETAILED DESCRIPTION OF THE PREFERRED EMBODIMENTS

An apparatus for detecting a touching position on a flat panel display of the present invention can be applied to any electronic product having a display panel, enabling it to provide the touch-sensitive function. The preferred embodiments of an apparatus for detecting a touching position on a flat panel display and the method thereof of the present invention will be described in detail with reference to the accompanying drawings.

Figure 1:
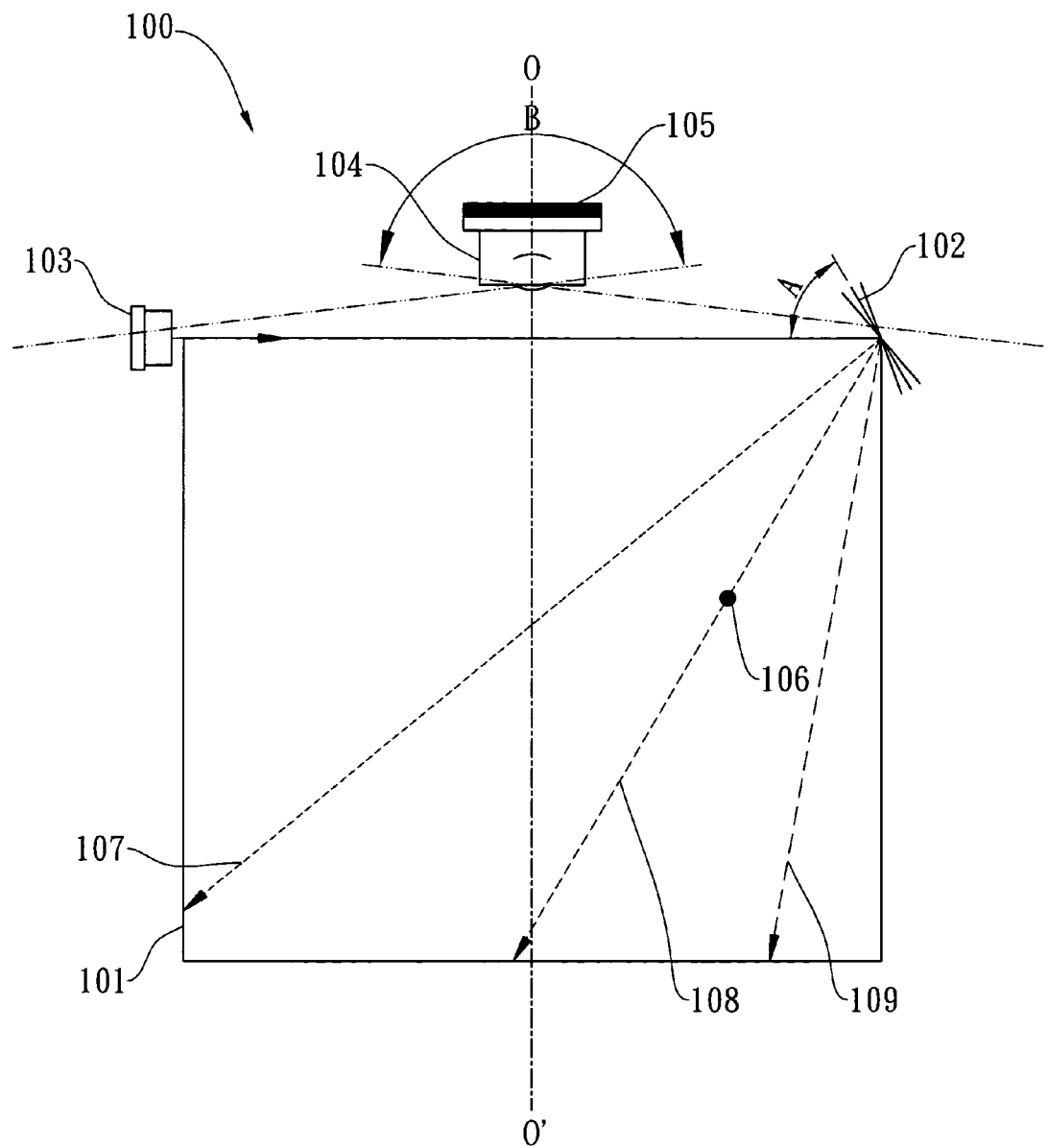
FIG. 1 shows a top view of an apparatus for detecting a touching position on a flat panel display in accordance with a first embodiment of the present invention.

FIG. 1 shows a top view of an apparatus for detecting a touching position on a flat panel display 100 in accordance with a first embodiment of the present invention. The apparatus for detecting a touching position on a flat panel display 100 includes: a display panel 101 which may be connected to a processing unit (not shown) to display text and picture information, such as images, pictures, characters and so forth; an electrically-controlled swing element 102 disposed at one top corner of the display panel 101, the angle of swing A thereof being an included angle between the light beam emitted by the light source 103 and the electrically-controlled swing element 102 and being controlled by an electrically-driven actuator (not shown); a light source 103 disposed at the other top corner of the display panel 101 opposite the electrically-controlled swing element 102; an optical system 104; and a photo-sensing element 105 disposed at an image plane of the optical system 104. The light source 103 may provide a parallel light beam, e.g. a laser beam, so that the divergence of the light beam will not be too large to affect the accuracy of the photo-sensing element 105 after the light beam travels for a distance. Furthermore, the light source 103 may be a non-visible or visible light. In the present invention, different driving voltages may be directed to the actuator, enabling the electrically-controlled swing element 102 to vary its swing angle A which is the included angle between the light beam from the light source 103 and the swing element 102. The light beam of the light source 103 after being projected onto the electrically-controlled swing element 102 is reflected to a display plane of the display panel 101, or an upper or lower plane proximate to the display plane, depending on the relative positions of the light source 103 and the display panel 101. As shown in FIG. 1, light beams 107, 108 and 109 are the reflected light beams. In the present invention, the display panel 101 may be a flexible display panel so that when a touching object, such as a finger or touch pen, touches it, the reflected light beam can strike the touching object. In the present invention, the electrically-controlled swing element 102 and the actuator (not shown) thereof may be embodied as a Micro-Electro-Mechanical System (MEMS), such as a commonly known MEMS Scanning Mirror. In the present invention, the actuator may be provided with driving voltage values that change periodically so that the angle at which the electrically-controlled swing element 102 swings can change periodically, thereby the light beam reflected by the electrically-controlled swing element 102 can successively scan the entire display plane of the display panel 101 to determine whether a touching object touches the display plane. In the present invention, the electrically-controlled swing element 102 swings periodically so that the light beam of the light source 103 reflected by the electrically-controlled swing element 102 can scan the entire display plane of the display panel 101 within a predetermined period of time, and the process repeats in a predetermined periodic cycle. The optical system 104 comprises at least one lens element and is disposed at an appropriate location near a side of the display panel 101 where the electrically-controlled swing element 102 and the light source 103 are disposed. For example, the optical system 104 may be disposed at a location near the middle of a side of the display panel 101, with the optical axis OO' of the optical system 104 parallel to the display plane and perpendicular to the light beam emitted by the light source 103. The photo-sensing element 105 may be an image sensing element, such as a linear CMOS sensor or a linear CCD sensor. In the present invention, the optical system 104 and the photo-sensing element 105 may be embodied as an imaging lens assembly. In the present invention, the angle of view of the optical system 104 covers the entire display plane of the display panel 101 (e.g. 165-170 degrees) to ensure that the entire display plane of the display panel 101 can be imaged on the photo-sensing element 105 through the optical system 104.

Figure 2:
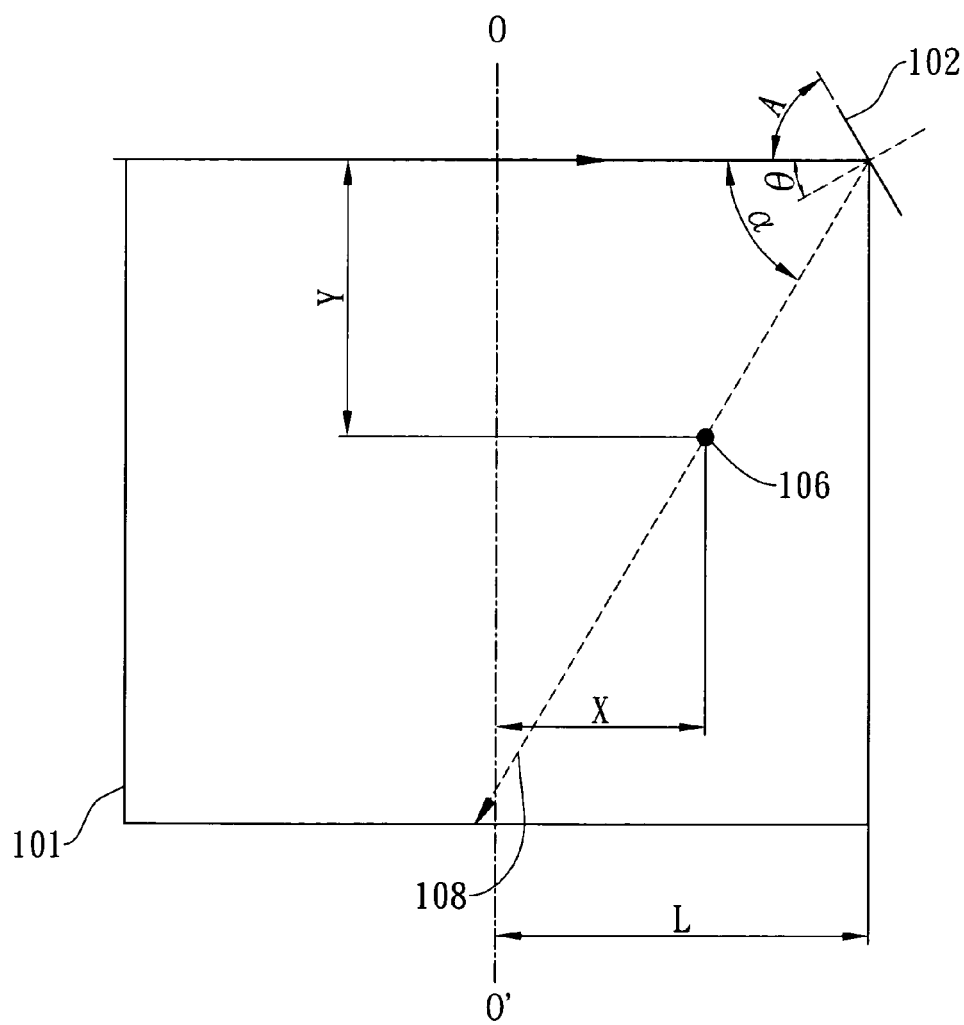
FIG. 2 is a diagram showing the geometric relationship between the relative positions of a touching object on a display plane, an emitted light beam and an electrically-controlled swing element in accordance with the first embodiment of the present invention.

A method adopted by the apparatus 100 of the first embodiment to detect a touching position on a flat panel display will be described with reference to FIG. 2. FIG. 2 is a diagram showing the geometric relationship between the relative positions of the touching object 106 on the display plane of the display panel 101, the light beam emitted by the light source 103 and the electrically-controlled swing element 102. The included angle between the electrically-controlled swing element 102 and the emitted light beam is A; the emitted light beam reflected onto the display plane by the electrically-controlled swing element 102 forms a reflected light beam 108; the included angle between the reflected light beam 108 and the emitted light beam is a which is twice the included angle $\theta$ between the emitted light beam and the normal line of the light reflecting surface of the electrically-controlled swing element 102. When the reflected light beam 108 strikes the touching object 106, a light spot is formed at the position where the touching object 106 touches the display panel, and then the reflected light of the light spot enters the optical system 104. The photo-sensing element 105 then captures information related to the one-dimensional image of the touching object 106 on the display plane, and a one-dimensional position of the touching object 106 can be determined by using this information. As shown in FIG. 2, the photo-sensing element 105 captures information related to the one-dimensional image of the touching object 106 on the display plane, and the X-coordinate of the touching object 106 with respect to the optical axis OO' of the optical system 104 can be determined by using this information. The processing unit (not shown) then determines the X coordinate of the touching object 106, wherein X is the distance between the optical axis OO' of the optical system 104 and the touching object 106. The distance between the optical axis OO' of the optical system 104 and the axis of rotation of the electrically-controlled swing element 102 is L. At the same time, the processing unit retrieves the driving voltage value of the actuator to determine the angle of swing A of the electrically-controlled swing element 102. Accordingly, the Y coordinate of the touching object 106 can be obtained by the trigonometric equation $Y=(\tan \alpha)*(L-X)$, wherein $\alpha=2\theta=2(90-A)$ and Y is the distance between the touching object 106 and the emitted light beam. In the present invention, the position of the touching object 106 on the display panel 101 is then determined from the obtained X-coordinate and Y-coordinate of the touching object 106 and the relative positions of the display panel 101, the electrically-controlled swing element 102, the light source 103 and the photo-sensing element 105, thereby achieving the function of detecting a touching position on a flat panel display.

According to a second embodiment of the present invention which shows another apparatus for detecting a touching position on a flat panel display, there is provided another method for detecting a touching position on a flat panel display. The only difference between the two embodiments of the present invention is that the optical system 104' and the photo-sensing element 105' in the second embodiment are different from those adopted in the first embodiment. The relationship between the positions of the display panel 101, the electrically-controlled swing element 102, the light source 103, the optical system 104' and the photo-sensing element 105' in the second embodiment are the same as that between the positions of the corresponding components in the first embodiment illustrated in FIG. 1. In the second embodiment, the reflected light beam 110 reflected from the touching object 106 and entering the optical system 104' is projected onto the photo-sensing element 105'. The photo-sensing element 105' then detects the reflected light beam 110 to further determine the included angle γ between the reflected light beam 110 that enters the optical system 104' and the optical axis OO'.

Figure 3:
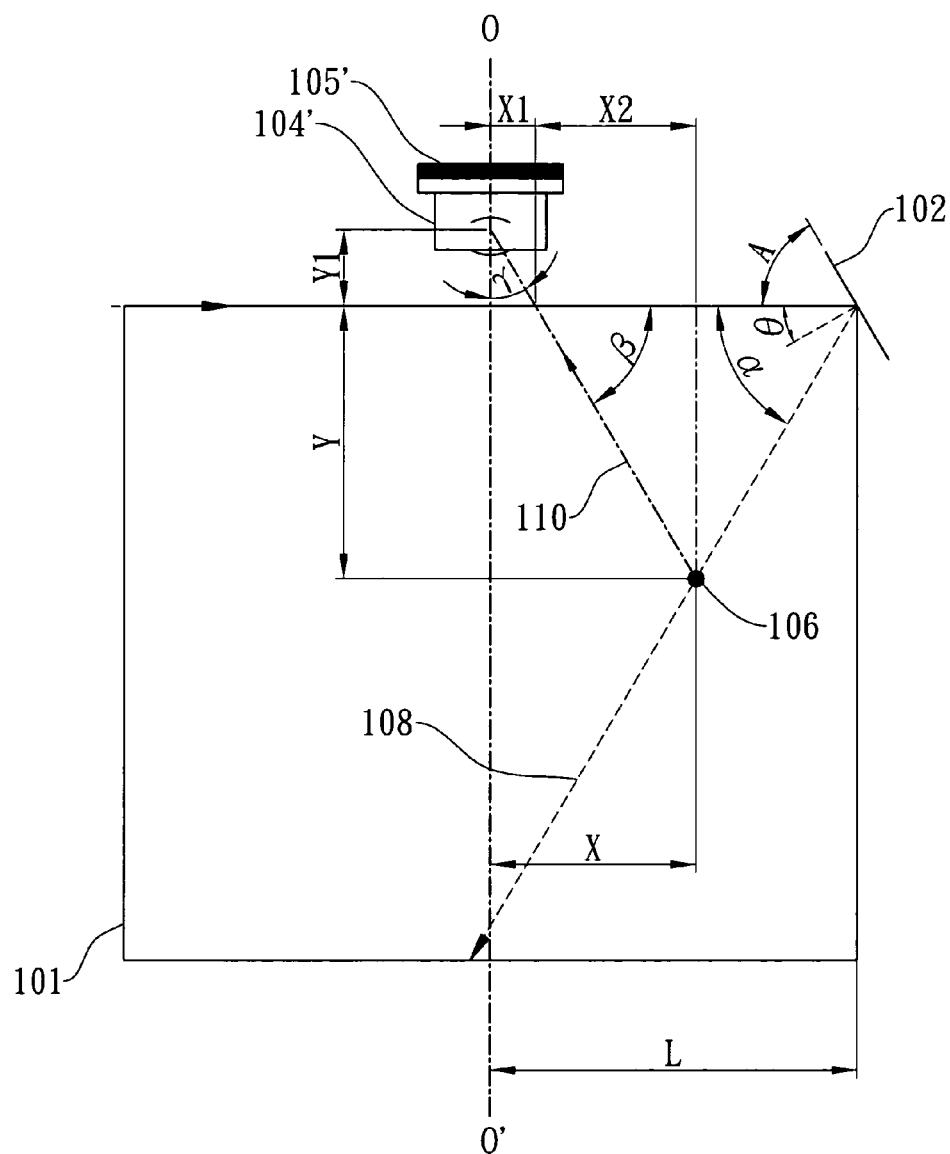
FIG. 3 is a diagram showing the geometric relationship between the relative positions of a touching object on a display plane, an emitted light beam and an electrically-controlled swing element in accordance with a second embodiment of the present invention.

FIG. 3 is a diagram showing the geometric relationship between the relative positions of the touching object 106 on the display plane of the display panel 101, the light beam emitted by the light source 103, the electrically-controlled swing element 102, the optical system 104' and the photo-sensing element 105' in accordance with the second embodiment of the present invention. The included angle between the electrically-controlled swing element 102 and the emitted light beam is A; the emitted light beam reflected onto the display plane by the electrically-controlled swing element 102 forms a reflected light beam 108; the included angle between the reflected light beam 108 and the emitted light beam is α which is twice the included angle θ between the emitted light beam and the normal line of the light reflecting surface of the electrically-controlled swing element 102; the distance between the emitted light beam and the optical system 104' is Y1. The reflected light beam 110, formed when the reflected light beam 108 strikes the touching object 106, is projected onto the optical system 104', and then the photo-sensing element 105' captures the angle γ at which the reflected light beam 110 enters the optical system 104'. The angle γ is the included angle between the reflected light beam 110 that enters the optical system 104' and the optical axis OO' of the optical system 104'. At the same time, the processing unit retrieves the driving voltage value of the actuator to acquire the angle of swing A of the electrically-controlled swing element 102, wherein α=2θ=2(90−A). The X coordinate of the touching object is obtained by the trigonometric equation $$X = X1 + X2 = Y1\tan\gamma + \frac{\tan\alpha(L - Y1\tan\gamma)}{\tan\alpha + \tan\beta},$$

wherein β=90−γ; X represents the distance between the optical axis OO' of the optical system 104' and the touching object 106; L represents the distance between the optical axis OO' of the optical system 104' and the axis of rotation of the electrically-controlled swing element 102. Furthermore, the Y coordinate of the touching object 106 can be obtained by the trigonometric equation $$Y = \tan\beta * \frac{\tan\alpha(L - Y1\tan\gamma)}{\tan\alpha + \tan\beta},$$

wherein Y represents the distance between the touching object 106 and the emitted light beam. In the present invention, the position of the touching object 106 on the display panel 101 is then determined from the obtained X-coordinate and Y-coordinate of the touching object 106 and the relative positions of the display panel 101, the electrically-controlled swing element 102, the light source 103 and the photo-sensing element 105', thereby achieving the function of detecting a touching position on a flat panel display.

In the first and second embodiments of the present invention, each of the optical systems 104 and 104' is disposed near the side of the display panel 101 where the electrically-controlled swing element 102 and the light source 103 are disposed, and the photo-sensing elements 105 and 105' are configured to receive the light reflected from the touching object 106. According to another aspect of the present invention, the photo-sensing elements 105 and 105' can receive and detect the light scattered from the touching object 106. Therefore, provided the optical axis OO' of the present optical system 104 (104') is parallel to the display plane of the display panel 101, and provided the optical system 104 (104') has a sufficient angle of view, the optical system 104 (104') may be disposed at an appropriate location near any side of the display panel 101 and the photo-sensing element 105 (105') can receive/detect the light scattered from the touching object 106.

The apparatus for detecting a touching position on a flat panel display according to the present invention has the following advantages:

1. It can be directly integrated with existing flat panel displays.

2. It does not require complex image recognition processing so that its response efficiency can be improved.

3. Its structure is relatively simple compared to those of other conventional apparatuses, thus the manufacturing cost can be reduced.

The preferred embodiments described above are exemplary and are not intended to limit the claim scope of the present invention. All modifications and variations made within the spirit of the invention shall be considered as falling within the scope of the present invention.

What is claimed is:

1. An apparatus for detecting a touching position on a flat panel display, including:
    a display panel for displaying text and picture information;
    an electrically-controlled swing element disposed at a first corner position of a side of the display panel, an angle of swing thereof being controlled by an electrically-driven actuator;
    a light source disposed at a second corner position opposite to the first corner position of the side of the display panel, a light beam thereof being reflected onto a display plane of the display panel or an upper or lower plane proximate to the display plane by the electrically-controlled swing element;
    an optical system disposed at a middle position of the side of the display panel, an optical axis thereof being parallel to the display plane and perpendicular to the light beam emitted by the light source; and
    a photo-sensing element for capturing image information disposed at an image plane of the optical system.

2. The apparatus for detecting a touching position on a flat panel display according to claim 1, wherein the light source is non-visible light.

3. The apparatus for detecting a touching position on a flat panel display according to claim 1, wherein the light source is a parallel light source.

4. The apparatus for detecting a touching position on a flat panel display according to claim 1, wherein the light source is a laser light source.

5. The apparatus for detecting a touching position on a flat panel display according to claim 1, wherein the electrically-controlled swing element swings with a pre-determined periodicity.

6. The apparatus for detecting a touching position on a flat panel display according to claim 1, wherein the range of the angle of swing of the electrically-controlled swing element enables the reflected light beam of the light source to scan the entire display plane of the display panel.

7. The apparatus for detecting a touching position on a flat panel display according to claim 1, wherein a field of view of the optical system covers the entire display plane of the display panel.

8. The apparatus for detecting a touching position on a flat panel display according to claim 1, wherein the angle of view of the optical system ranges from 165 to 170 degrees.

9. The apparatus for detecting a touching position on a flat panel display according to claim 1, wherein the optical system comprises at least one lens element.

10. The apparatus for detecting a touching position on a flat panel display according to claim 1, wherein the display panel is a flexible display panel.

11. The apparatus for detecting a touching position on a flat panel display according to claim 1, wherein the photo-sensing element is either a linear CMOS sensor or a linear CCD sensor.

12. The apparatus for detecting a touching position on a flat panel display according to claim 1, wherein the photo-sensing element is used for detecting a one-dimensional position of a touching point on the display panel, and another one-dimensional position of the touching point is obtained from the said one-dimensional position and the angle of swing of the electrically-controlled swing element.

13. The apparatus for detecting a touching position on a flat panel display according to claim 1, wherein the photo-sensing element is used for detecting image information related to an included angle between the optical axis of the optical system and the light beam entering the optical system reflected from a touching point on the display panel, and the X-coordinate and Y-coordinate of the touching point are obtained from the included angle and the angle of swing of the electrically-controlled swing element.

14. A method for detecting a touching position on a flat display panel, including the steps of:

emitting a light beam from a light source disposed at a first corner position of a side of a display panel;

reflecting the light beam periodically by an electrically-controlled swing element disposed at a second corner position opposite to the first corner position of the side of the display panel onto the display plane of the flat display panel or an upper or lower plane proximate to the display plane such that the scanning range of the reflected light beam covers the entire display plane;

capturing image information with an optical system related to a one-dimensional position of a touching point on the display plane through which a one-dimensional position of the touching point can be determined, or capturing image information related to an included angle between an optical axis of the optical system and a light beam entering the optical system reflected from the touching point; and obtaining another one-dimensional position of the touching point from information related to the one-dimensional image through which the one-dimensional position of the touching point can be obtained and an included angle between the light beam and its reflected light beam, or from the included angle between the optical axis of the optical system and the light beam entering the optical system reflected from the touching point and the included angle between the light beam and its reflected light beam;

wherein the optical system is disposed at a middle position of the side of the display panel; and wherein the optical axis of the optical system is parallel to the display plane and perpendicular to the light beam emitted from the light source.

15. The method for detecting a touching position on a flat display panel according to claim 14, wherein the light beam is a parallel light beam.

16. The method for detecting a touching position on a flat display panel according to claim 14, wherein the light beam is non-visible light.

* * * * *